(12) United States Patent
Ferraro

(10) Patent No.: US 6,703,720 B1
(45) Date of Patent: Mar. 9, 2004

(54) WIND POWERED GENERATOR DEVICE

(76) Inventor: Michael Ferraro, 2114 W. Arthur, Chicago, IL (US) 60645

( * ) Notice: Subject to any disclaimer, the term of this patent is extended or adjusted under 35 U.S.C. 154(b) by 0 days.

(21) Appl. No.: 09/672,923

(22) Filed: Sep. 28, 2000

(51) Int. Cl.$^7$ .............................. F03D 9/00; F03D 7/02; H02P 9/04; F03B 15/06

(52) U.S. Cl. ........................ 290/55; 415/4.5; 244/53 R; 244/53 B; 261/DIG. 87

(58) Field of Search ........................... 290/55; 415/4.5; 244/53 R, 53 B; 261/DIG. 87

(56) References Cited

U.S. PATENT DOCUMENTS

| | | | | |
|---|---|---|---|---|
| 1,737,610 A | * | 12/1929 | Norton | |
| 3,730,643 A | * | 5/1973 | Davison | 290/55 |
| 3,757,664 A | * | 9/1973 | Jalbert | 98/37 |
| 3,924,827 A | * | 12/1975 | Lois | 244/153 R |
| 3,936,652 A | * | 2/1976 | Levine | 261/DIG. 11 |
| 4,012,163 A | * | 3/1977 | Baumgartner et al. | 180/2.2 |
| 4,016,725 A | * | 4/1977 | Fiss | 165/900 |
| 4,031,173 A | * | 6/1977 | Rogers | 165/900 |
| 4,036,916 A | * | 7/1977 | Agsten | 261/109 |
| 4,070,131 A | * | 1/1978 | Yen | 261/DIG. 87 |
| 4,076,190 A | * | 2/1978 | Lois | 244/153 R |
| 4,079,264 A | * | 3/1978 | Cohen | 290/44 |
| 4,159,426 A | * | 6/1979 | Staton | 290/44 |
| 4,166,596 A | * | 9/1979 | Mouton et al. | 244/30 |
| 4,208,168 A | * | 6/1980 | Chen et al. | 416/132 B |
| 4,316,361 A | * | 2/1982 | Hoar | 290/55 |
| 4,342,539 A | * | 8/1982 | Potter | 416/9 |
| 4,398,096 A | * | 8/1983 | Faurholtz | 290/55 |
| 4,424,452 A | * | 1/1984 | Francis | 290/55 |
| 4,452,046 A | * | 6/1984 | Valentin | 60/641.11 |
| 4,495,423 A | * | 1/1985 | Rogers | 290/44 |
| 4,499,034 A | * | 2/1985 | McAllister, Jr. | 261/109 |
| 4,530,642 A | * | 7/1985 | Yang | 416/119 |
| 4,706,593 A | * | 11/1987 | Vail, Jr. | 114/211 |
| 4,759,271 A | * | 7/1988 | Bliemeister | 98/37 |
| 4,764,683 A | * | 8/1988 | Coombes | 290/55 |
| 5,134,952 A | * | 8/1992 | Doolittle | 114/39.2 |
| 5,284,628 A | * | 2/1994 | Prueitt | 422/168 |
| 5,289,042 A | * | 2/1994 | Lis | 290/55 |
| 5,300,817 A | * | 4/1994 | Baird | 290/55 |
| 5,372,080 A | * | 12/1994 | Sewell | 114/39.002 |
| 5,395,598 A | * | 3/1995 | Prueitt | 422/168 |
| 5,588,386 A | * | 12/1996 | Schilt | 114/211 |
| 5,680,032 A | * | 10/1997 | Pena | 320/61 |
| 5,687,666 A | * | 11/1997 | Thoresen | 114/90 |
| 5,784,978 A | * | 7/1998 | Saiz | 114/103 |
| 5,977,649 A | * | 11/1999 | Dahill | 290/55 |
| 6,126,385 A | * | 10/2000 | Lamont | 415/4.5 |
| 6,249,059 B1 | * | 6/2001 | Hosoda | 290/55 |
| 6,289,834 B1 | * | 9/2001 | Phillips | 114/211 |
| 6,532,740 B1 | * | 3/2003 | Sullivan | 60/641.11 |

FOREIGN PATENT DOCUMENTS

DE            004234649 A1 * 10/1992

* cited by examiner

Primary Examiner—Nestor Ramirez
Assistant Examiner—Pedro J. Cuevas
(74) Attorney, Agent, or Firm—Todd S. Parkhurst

(57) ABSTRACT

A wind powered generating device comprises a tube cluster, a collector assembly, and a turbine assembly. The collector assemblies utilize sails that can be rotated in the direction of the wind to direct wind down through an inlet tube to a central outlet tube. The central outlet tube is narrowed at a portion, and a turbine is mounted at this narrowed portion to take advantage of the venturi effect, which accelerates the air as it passes the turbine. This permits reliable and efficient operation in areas that were not formerly windy enough to be economically feasible. Alternative embodiments of the invention include mechanisms for dealing with violent weather conditions, a first of which allows excess wind to bleed off behind and between the sails, and a second which collapses and covers the sails with a protective sheath/sock.

6 Claims, 7 Drawing Sheets

WIND POWERED GENERATOR DEVICE

BACKGROUND OF THE INVENTION

1. Field of the Invention

The invention is directed to a wind powered generating device that improves the efficiency of such devices comprising a tube cluster, a collector assembly, and an underground turbine assembly.

2. Description of the Related Art

Wind-powered generators have been around for some time. In conventional wind-powered generators, a sustained ambient wind speed of 11–13 mph to attain "cut-in" speed (the point at which the turbine is generating sufficient power to be safely and efficiently placed on the grid) is required. At cut-in speed, conventional turbines are only generating about 20% of their rated power, and they do not reach their peak rated power output until wind speeds reach 25–30 mph. This means that there are relatively few places in the world in which wind generators can be considered a reliable source of electricity.

Over the years, sophisticated control systems and blade designs have been developed to assure relatively stable output characteristics over a wide range of wind conditions, but despite a steady flow of incremental improvements, the need for an ambient wind speed of at least 11–13 mph persists. Before a site is considered to be commercially viable, it must reliably produce winds much higher than those necessary for cut-in speed, consistently bringing the turbine up to or at least close to its full rated power. In the United States, there are limited areas where such conditions exist.

The problem of finding suitably windy sites is not presently the only issue which is hindering the growth of the wind power industry. With the height of the latest wind generators approaching 230 ft., wind farms utilizing present designs are increasingly becoming a hazard to migratory birds and private air traffic. Construction and maintenance costs are skyrocketing as these new machines tower to ever increasing heights, and discussions about noise and visual effects on the landscape are also becoming contentious.

A widely accepted, practical formula for estimating the power output of a wind turbine is as follows:

$$P = 0.5 \times rho \times A \times CP \times V^3$$

where

P=power in watts (746 watts=1 hp)(1,000 watts=1 kilowatt)

rho=air density (about 1.225 kg/m$^3$ at sea level, less at higher altitudes)

A=the swept area of the rotor exposed to the wind (m$^2$)

CP=Coefficient of performance (0.59 {the Betz Limit} is the maximum theoretically possible; 0.35 is considered to be a good design)

V=wind speed in meters/sec (20 mph=9 m/s)

Other related variables include:

Ng=generator efficiency (50% for a car alternator, 80% or possibly more for a permanent magnet generator or grid-connected induction generator)

Nb=gearbox/bearing efficiency (good designs can yield an efficiency as high as 95%)

From the above formula, it can be seen that the easiest way to increase the power output of a wind turbine is to increase the velocity of the air passing the capture area (the area swept by the turbine blades). Because power increases by the cube of V, even small increases in wind velocity within the capture area yield relatively large increases in power output. Unfortunately, manipulating the wind speed using conventional free-air designs is not possible, since, by definition, the wind speed is the ambient wind speed. If, however, the air speed passing the turbine blades could be accelerated, the following benefits would result:

1) Wind generators would reach both cut-in speed and full rated power at lower ambient wind speeds. This could result in raising large parts of the world by as much as a whole power class (as defined by the United States Department of Energy), meaning that many areas which are now considered unsuitable as wind sites would become available as viable sites. The resultant decentralization of generators would insure that the grid as a whole was less vulnerable to the uncertainties of local weather conditions.

2) Intermittency (the time that the turbine spends below its cut-in speed) would be reduced, and conversely, availability would increase, resulting in an increase in annual energy output. This increase in efficiency would lower the average cost of power generation, making wind even more competitive with other sources of electricity.

Furthermore, conventional free-air turbines are engineered to have a service life of between 20 and 24 years, with scheduled periodic maintenance and one major overhaul at some point in time near mid-life. One of the most persistent problems that has plagued the industry has been a rate of component failure, especially blade failure, which is higher, sometimes much higher, than that predicted by computer models. This disparity between predicted and actual component life has been suggested by engineers to be due in great measure to the sheer number of unpredictable variables in a free-air system. The speed of the wind typically increases as one rises above the frictional elements close to the ground. This means that the forces which are exerted on the blade components traveling through the top of the rotor arc are significantly greater than those at the bottom of the arc. In addition to the cyclic flexing of the blades as they are subjected to these differences in wind speeds, they are also subject to alternating states of compression and tension as they travel around the hub. Wind gusts, off-axis buffeting, and structural harmonics provide additional sources of chaotic loading to the system, stressing not just the blade set, but the rotor hub, gearbox, and all associated bearings.

The cost of refitting a 1 megawatt free-air turbine with a new blade set, which typically has a diameter of approximately 60 meters, can easily exceed $300,000 U.S. (1999), which is about one third of the installed cost of the unit. From this we can see that any improvements which are capable of extending the service life of the system have the potential to make wind energy a more competitive alternative to other forms of power generation.

Present tower designs also produce the undesirable effect of stroboscopic flicker, which occurs to a stationary viewer on the ground when each blade passes between the viewer and the sun. This effect can be annoying to residents living within view of the towers, especially at those times of day when the sun is low in the sky.

Early designs in power generating devices have taken various approaches to maximizing efficiency while considering related design parameters. U.S. Pat. No. 1,600,105 issued to Fonkiewicz in 1923 shows a power generating device with a vertical stack having a turbine within, and radially extending tunnels that communicate with the stack, the tunnels being located below the ground surface and having openings in the ground. U.S. Pat. No. 4,036,916 issued to Agsten in 1977 shows a wind driven electric power generator with an updraft natural draft cooling tower having a hyperbolic veil with a wind driven electric generator system positioned at a narrowed area of the hyperbolic veil. U.S. Pat. No. 581,311 issued to Scovel in 1897 shows a rotatable hood positioned on top of a tube containing fans, which rotates to capture wind and direct wind to the fans. U.S. Pat. No. 4,049,362 issued to Rineer in 1977 shows air foil panels utilizing fabric to capture wind to generate power. Finally, U.S. Pat. No. 4,779,006 issued to Wortham in 1988 shows a hybrid solar-wind energy conversion system having a "J" shaped tubular stack with a generator fan positioned in a tube below the surface of the ground.

In general, however, none of these related art references utilize strong lightweight structures that are self-regulating and easily turn to face the incoming wind, redirecting a substantial portion of the kinetic energy present in the ambient air stream into a tube set, where the air is channeled into a below-ground turbine located at a narrowing in an output tube which takes advantage of the venturi effect, enabling significant efficiency and operating capability even at low wind speeds.

SUMMARY OF THE INVENTION

An object of the invention is to create a device that will collect, redirect, and accelerate ambient air, then channel it to the capture area of a turbine, thereby surpassing the performance of a conventional wind turbine operating in free air, and other conventional designs, with minimal noise and environmental impact, allowing economical operation in areas that were infeasible with previous designs.

This object is achieved with a wind-powered generation device comprising a tube cluster, collector assemblies, and a turbine assembly where the tube cluster and turbine assembly are primarily underground, and the central outlet tube is narrowed/pinched at the center to increase the rate of airflow past the turbine by taking advantage of the known venturi effect. Lightweight, self-regulating collector assemblies gather a much greater volume of air than could be captured by a turbine rotor assembly in free air while greatly reducing the variability in the speed of the wind passing the blades. The tube set which channels the collected air and accelerates it as it passes the rotor, combined with the rotor which operates on a plane parallel to the ground, creates a system which significantly reduces the amount of buffeting, tension-compression variability, asymmetrical loading, and other elements of component stress, both cyclic and non-periodic, that are major sources of fatigue-related structural failure. The resultant increase in reliability and service life, and the reduction in maintenance costs, effectively lower the per-kilowatt cost of generating energy. Additionally, the present design eliminates the flicker effect produced by existing tower designs since its turbine blade is underground.

In areas where wind energy may be marginal or intermittent, but heat energy is abundant and readily available, and additional mechanism may be used to boost the efficiency of the system. The rising of warm air is a well-known phenomenon, hence, heat injected into the air stream at the proper place in the main outlet tube would serve to boost the performance of the system. Two potential sources of heat are solar and geothermal.

Well-planned combinations of functions provide investors with an extra measure for profit, thus encouraging more investment in environmentally sound generating sources such as wind. For example, during periods of high wind and low demand, generators placed next to coastlines could be taken off of the power grid and put to other tasks, such as the purification and desalination of seawater, the creation of oxygen gas, hydrogen fuel for fuel cells and other hydrogen-powered equipment, and other valuable commodities that can be produced by way of electrolytic reactions.

The system may be tuned by varying parameters on the open tubes to promote phase cancellation of low-frequency acoustic energy (ranging from below 8 Hz to above 20 Hz). This may be needed for the following reason: because of the low rotational speeds of the turbine blades, the peak acoustic energy radiated by the current generation of turbines is in the infrasonic range (8–12 Hz) for large diameter turbines, and in the low-frequency end of the audible spectrum (20 Hz) for smaller turbines or those with multiple blades. While it is true that acoustic pulses at these frequencies are generally considered to be more of an annoyance than anything else, powerful infrasonic waves were found by the U.S. military to have deleterious effects on humans (nausea, vomiting, dizziness) (although these problems were overcome by the use of ear plugs). Other mechanisms for dealing with this issue may be considered as well.

BRIEF DESCRIPTION OF THE DRAWINGS

The invention, together with further advantages, is explained in greater detail below with reference to the drawings.

DESCRIPTION OF THE PREFERRED EMBODIMENTS

Figure 1:
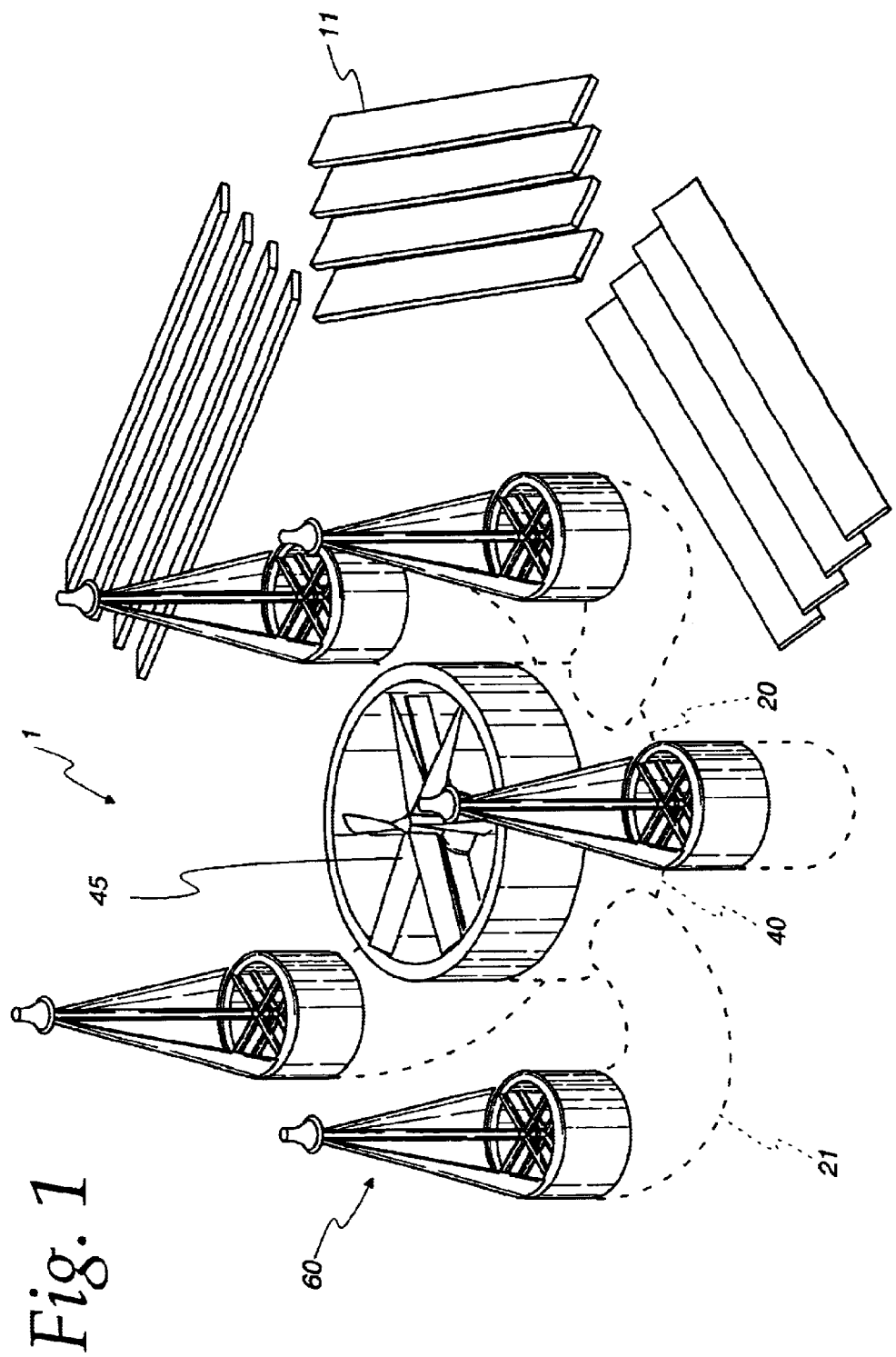
FIG. 1 is a perspective view of the overall wind powered generator device.

FIG. 1 shows the overall wind powered generator device 1 that comprises a tube cluster 20, collector assemblies 60, and a turbine assembly 45.

Figure 2:
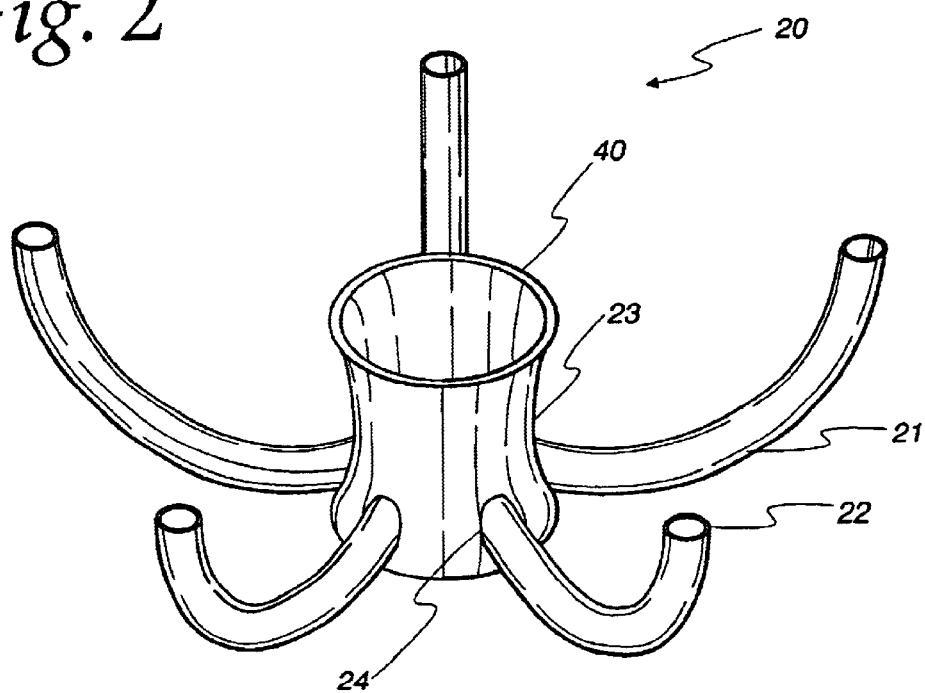
FIG. 2 is a perspective view of the tube cluster.

According to FIG. 2, the tube cluster 20 comprises a number of J-shaped inlet tubes 21, and a central outlet tube 40. In operation, tube clusters will be substantially buried underground, eliminating the hazard to migrating birds and private air traffic that current free-air turbine designs present. The sum of the cross-sectional areas of the inlet tubes should preferably be greater than the cross-sectional area of the outlet tube for the system to operate efficiently. The main/ central outlet tube 40 is pinched at the center to provide a narrow center 23 with a smaller radius than the remainder of the tube in order to invoke the known venturi effect which states that at any given pressure and rate of air inflow through the system, air must accelerate as it passes through a narrower portion of a tube. With the addition of a few simple collector assemblies 60 (FIG. 6) mounted on top of the inlet tubes 21, ambient air is redirected, thereby pressurizing this system of tubes. This management and redirection of airflow is an important element for increasing the efficiency of the system. The inlet tube collector ends 22 are arranged in a staggered manner in order to minimize the occurrence of multiple tubes aligning with the wind, causing one collector assembly 60 to form a "wind shadow" in front of the other, resulting in a pressure drop in the system and a resultant drop in output power.

Figure 4:
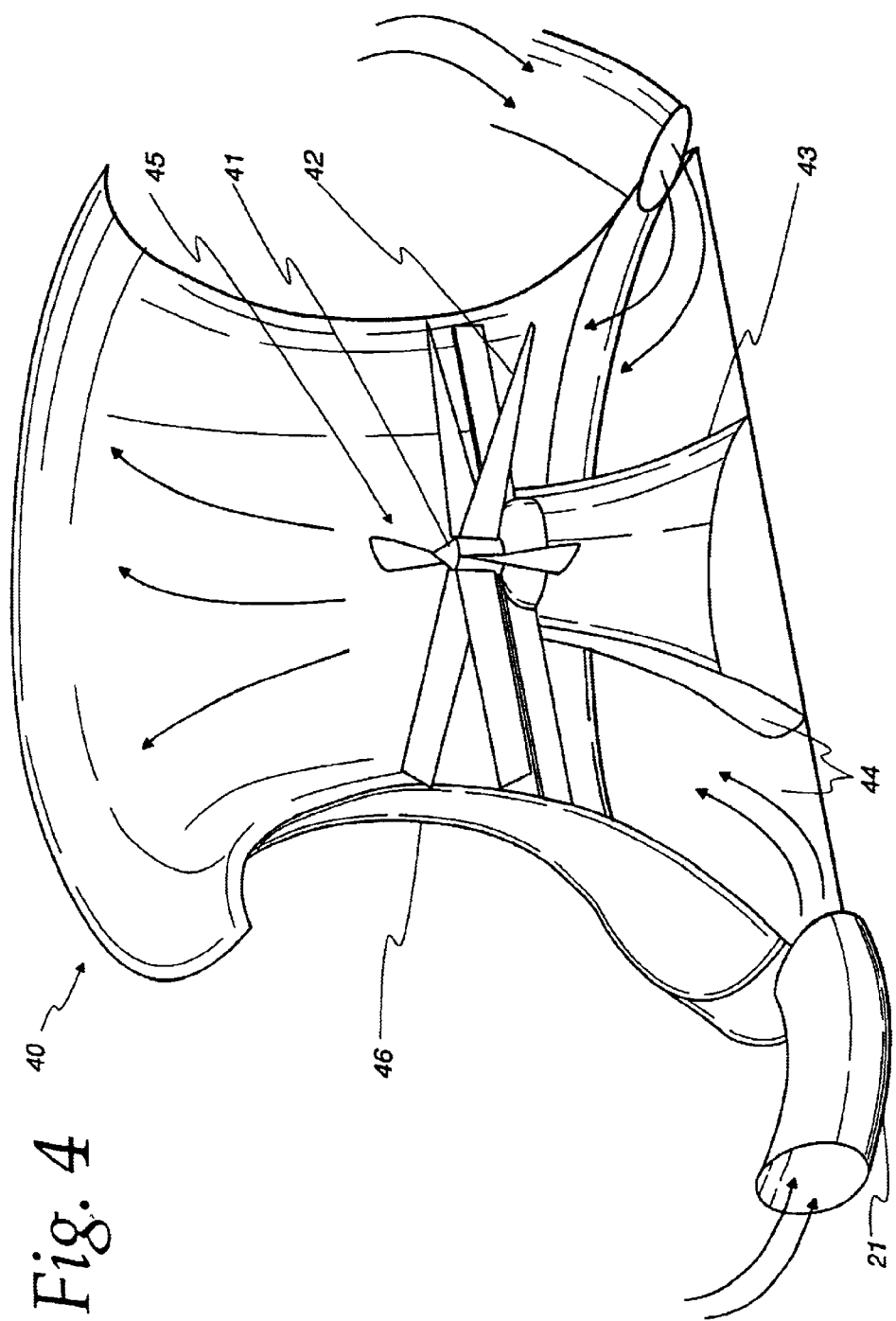
FIG. 4 is a perspective view of the central outlet tube showing the turbine and generator nacelle.

In FIG. 4, the central outlet (main) tube 40 is shown with the turbine assembly 45 which comprises the turbine 41 having turbine blades 42, and a generator nacelle 43 suspended vertically in the central outlet tube 40. Air captured and redirected by the collectors 60 is forced to accelerate as it passes the narrow section 46 of the central outlet tube 40 and the plane of the turbine blades 42. The transition from a vertical to a horizontal axis turbine should be possible with only minor modifications to the design of existing turbine and generator assemblies.

Figure 5:
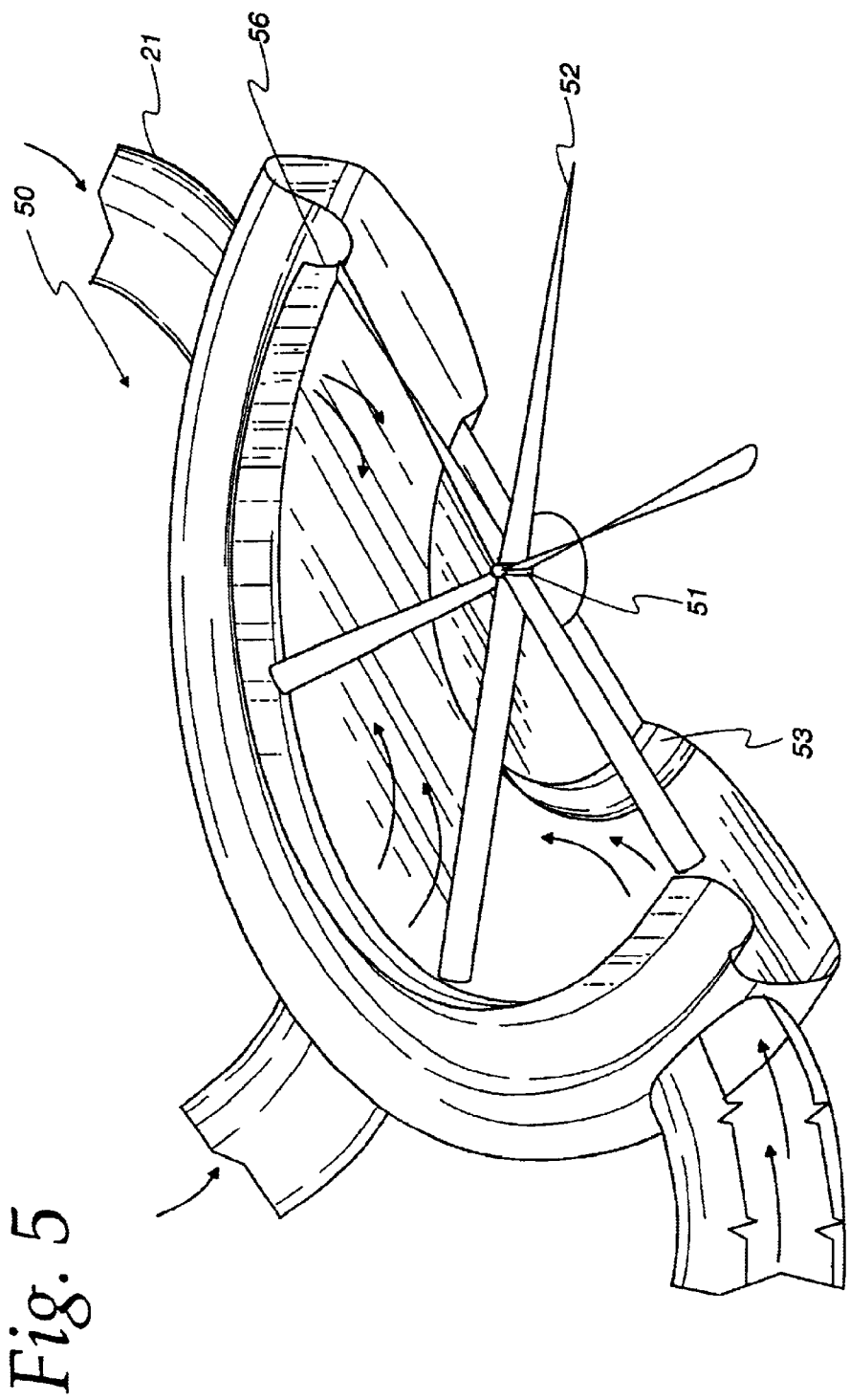
FIG. 5 is a perspective view of a flattened central outlet tube and turbine.
Figure 7:
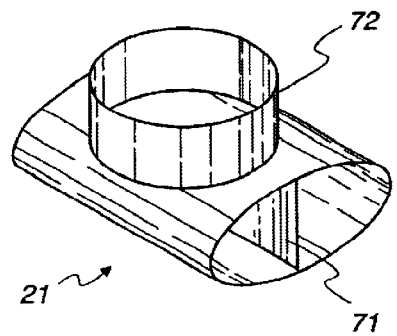
FIG. 7 is a perspective view of an inlet tube having an oval cross-section, with a support and an adjoining duct.
Figure 8:
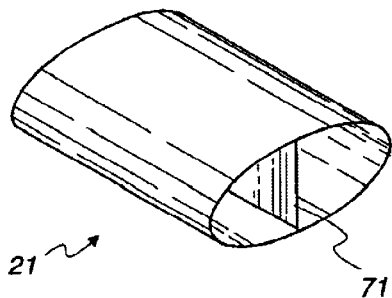
FIG. 8 is a perspective view of the inlet tube of FIG. 7 without the adjoining duct.
Figure 9:
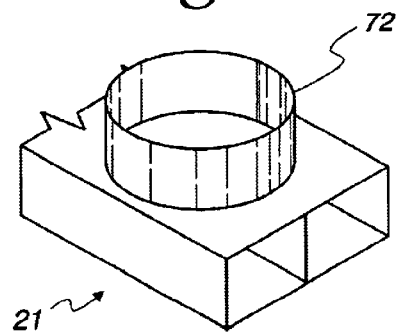
FIG. 9 is a perspective view of an inlet tube having a rectangular cross-section, with an adjoining duct.
Figure 10:
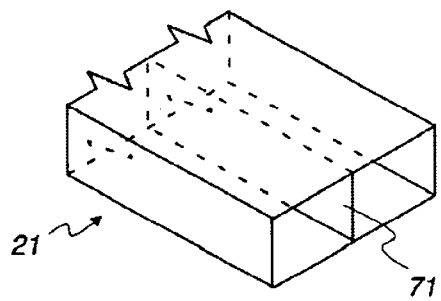
FIG. 10 is a perspective view of the inlet tube of FIG. 9 without the adjoining duct and having a support.

FIG. 5 illustrates an alternative embodiment having a flattened central outlet tube which may be used where minimal excavation is desired. Like central outlet tube 40, flattened central outlet tube 50 comprises a turbine 51 having turbine blades 52 and a generator nacelle 53, all elements being designed to accommodate the shortened dimensions of the flattened central outlet tube 50. The air flow is introduced by an inlet tube 21 having a flattened profile, such as those exemplified by the inlet tubes in FIGS. 7 and 8 having an oval cross section, or by those exemplified by the inlet tubes in FIGS. 9 and 10 having a rectangular cross section. In FIG. 7, the oval inlet tube 21 has a support 71 to provide structural integrity to the tube, and an adjoining duct 72 which allows tubes to be connected together and arranged without resorting to customized bending, etc. FIG. 8 shows the oval inlet tube 21 of FIG. 7 without the adjoining duct 27. FIG. 9 shows a rectangular inlet tube 21 with a rectangular cross section having an adjoining duct 72. FIG. 10 shows the rectangular tube of FIG. 9 having a support 71, but without the adjoining duct 72. What is particularly advantageous with the tube sections shown in FIGS. 7–10 is that these sections can actually be manufactured as individual modular components so that they could be cast in concrete or extruded from recycled plastic and transported to the site by truck. Note that the central outlet tube 40 containing the turbine and generator assembly could be similarly precast in pie-shaped slices and transported to the site for assembly. These low-profile components could greatly reduce installation costs. It may even be possible to assemble them right on the ground and build a small berm around them, eliminating the requirement for digging altogether.

Figure 6:
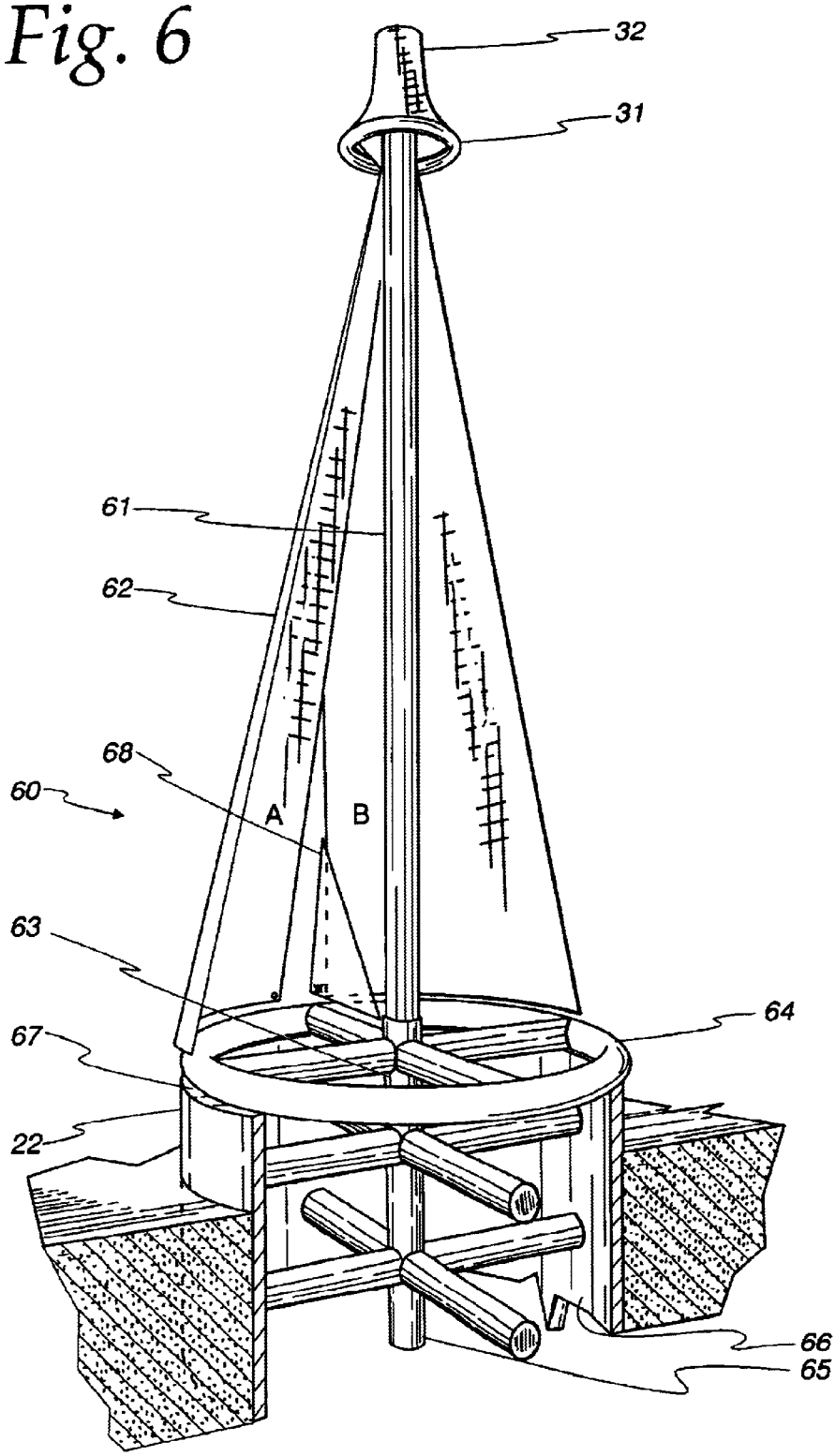
FIG. 6 is a perspective view of the collector assembly.

In FIG. 6, one preferred embodiment for the collector assembly 60 comprises a frame having a vertical mast 61 and a braced, wheel-like boom 64 used to help shape the sail set 62 and transfer loads to the wall 66 of the inlet tube 21 by way of a sub-frame 65. This arrangement allows the mast 61, boom 64, and sail set 62 to spin freely along the y-axis, much like a weather vane on its mount, and helps assure that when the sails are fully deployed, the collector assembly 60 will always face the wind.

Each of the sails in the sail set 62 covers an arc of approximately 90° across the rim 67 of the inlet tube 21. The purpose of the collector assembly 60 is to capture ambient breezes and redirect them into the inlet tube 21. The sail area for each collector assembly 60 should be greater than the cross-sectional area of the inlet tube 21 for the system to work efficiently. Because the cut of the sails 62 will determine the final shape of the working surfaces of the collector assembly 60 elements, on-site fine tuning of the optimal collector shapes will be practical long after the initial installation has been completed. Sail sets 62 can be easily cut into a wide variety of shapes to take advantage of prevailing local wind conditions, making it a relatively simple matter to implement improved collector designs in a cost-efficient manner. Although the sail sets 62 will most likely have to be replaced every year or so, the cost of replacement would be a tiny faction of the costs typically incurred during the normal operation of a conventional fuel burning plant, such as the costs of fuel, emission control, maintenance, and toxic waste disposal.

Figure 11:
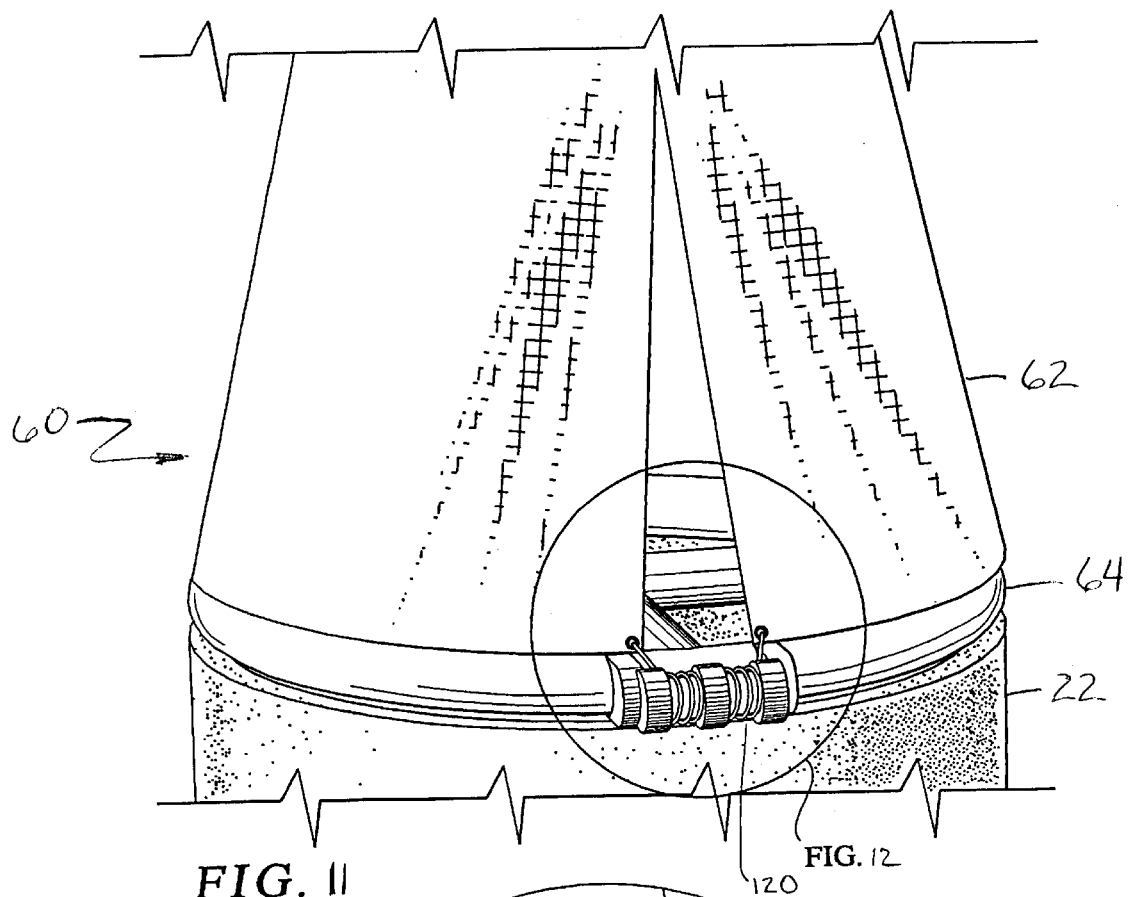
FIG. 11 is a perspective view of the collector assembly with the two-piece sail set deployed.
Figure 12:
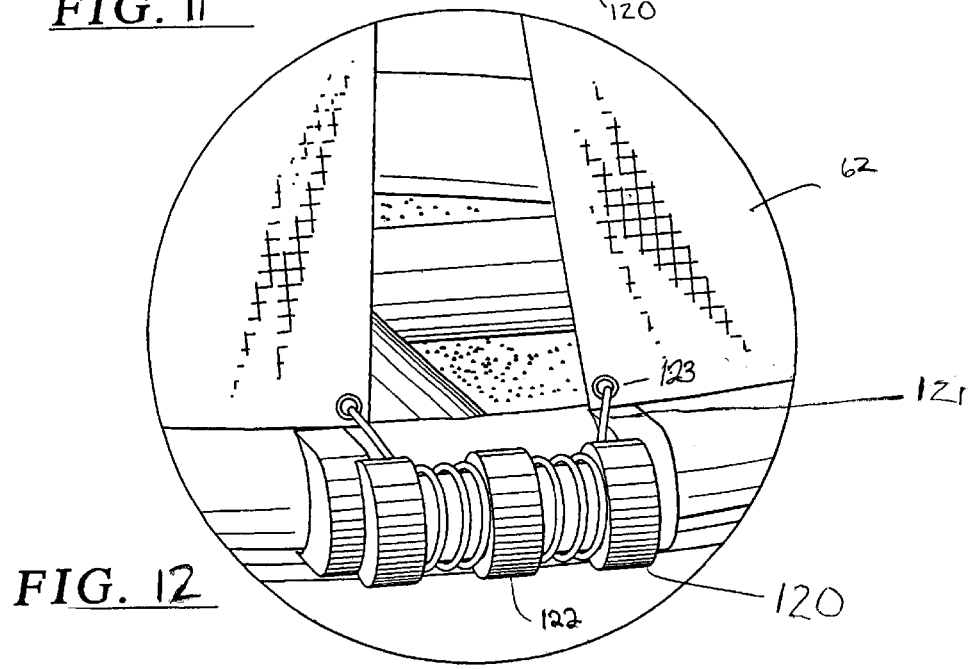
FIG. 12 is a perspective view of the drum tensioner.

In order to prevent damage to the collector assemblies 60 during storms and other high wind situations, the collector assemblies 60 comprise a mechanism for managing wind loads. FIGS. 11 and 12 show a preferred embodiment for this mechanism, which is a spring loaded, damped, drum-style tensioner 120 having two lengths of wound cable 121, preferably made of steel for strength. The cable 121 ends opposite the drum 122 are attached to the sails 62, providing a constant tension on the sails and helping them maintain their optimal shape, in a manner similar to the operation of the spring loaded roller on a window shade. The cable ends are attached to the drum 122 on one end, and to grommets 123 on the sails 62, possibly using hooks, on the other end.

As the wind load on the system increases past that needed for peak output of the turbine, pressure on the sails 62 increases and the tensioning cables on the drum 122 begin to unwind, causing the sails 62 to move in an upward direction along the y-axis, which creates a gap between each of the sails 62 and between the sails 62 and the inlet tube 21 and the braced boom 64, causing air to spill through the back of the collector assembly 60. This mechanism provides adequate wind load management in all but the most violent weather. In an alternative embodiment, the tensioner could utilize counterweights in a gravity powered sail tensioner in place of the springs to maintain tension on the sails 62.

Figure 3:
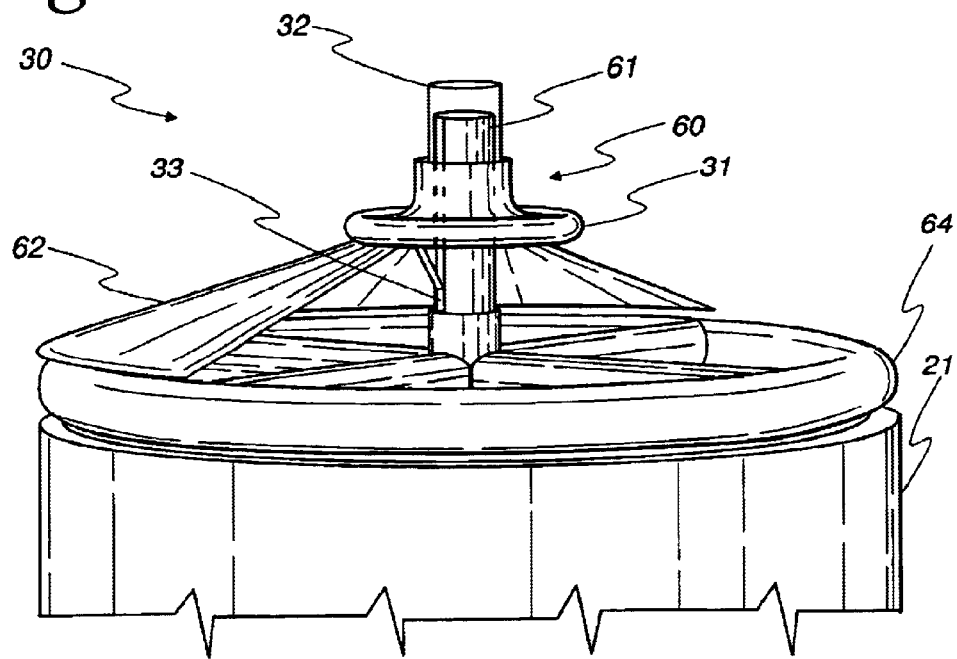
FIG. 3 is a perspective view of the collector assembly with a sail cover deployed.

According to FIG. 3, if wind loads increase past the point where they could be managed by the tensioning mechanism, an emergency strain relief system may be provided under critical load conditions. When such a situation occurs, the wind powered generator device 1 may employ an emergency sail collector 30 comprising a collector loop 31 attached to a sock-like piece of sailcloth 32 at the top of the mast 61. This sock 32 operates as a sail cover and is basically a cloth tube which is deployed and functions in a manner similar to an umbrella cover.

When the strain on the collector assembly 60 reaches some critical point, the collector loop 31 falls or is pulled down the mast 61 on a collector loop track 33 (which runs the full length of the front of the mast 61, where the assembly is free to move without fouling the sails), taking the sock 32 with it, effectively dousing the sail. The collector loop 31 collects the sails as it travels down the track 33 and pulls the sock 32 along with it, thus relieving pressure on the collector assembly 60. The collector loop 31 ring release may be tripped either mechanically, (for instance, by a mechanical load sensor attached to the sail tensioners and connected by cable to a release at the top of the mast), or electronically (for instance, by radio signal transmitted to the release when the site anemometer detects a set wind level). Likewise, the collector loop 31 could be motivated by gravity, using a weighted ring, or electrically, using an electric motor to pull the ring down the track. A reset of the collector loop could be achieved manually by way of cables and pulleys (much like a traditional sail), or by electric motor. An electrically operated system could be reset remotely or in an automated manner. Although this action takes take the generator off line, it provides substantial protection to the collector assembly 60 against permanent damage. Since the collector loop 31 is only deployed under critical load conditions, it would rarely cause a shutdown of the system.

In another preferred embodiment, a steering sail 68 is provided which is oriented in a direction perpendicular to the sail set 62. The steering sail 68 permits improved sensitivity and response time of the collector assembly 60 without adding drag to the system.

FIG. 1 shows a typical installation using a wind-thermal hybrid, with heat for a liquid thermal transfer medium, which is preferably non-toxic, supplied by conventional solar collectors 11. Unlike conventional geothermal power plants, no steam is required to provide turbine boost, so areas which are now volcanically active but produce insufficient heat to produce steam could easily provide more than enough heat energy to boost the efficiency of this system. FIG. 4 illustrates a preferred placement of heat radiating surfaces/elements 44 within the main tube.

The above-described wind-powered generating device is illustrative of the principles of the present invention. Numerous modifications and adaptations thereof will be readily apparent to those skilled in this art without departing from the spirit and scope of the present invention.

What is claimed is:

1. A wind driven power generating device to be driven by an airflow, the device comprising:
   a tube cluster comprising
   a central outlet tube having a narrowed center for channeling an upward flowing airflow;
   a plurality of inlet tubes;
   each inlet tube being defined by a cylindrical wall;
   each inlet tube further having a collector end located at a distance from said central outlet tube, each inlet tube communicating with said central outlet tube for delivering airflow from said inlet tube collector end to said central outlet tube;
   each collector end having a wind collector assembly comprising a plurality of sails located adjacent to one another, a bottom end of each said individual sail extending along a curved boom; and
   the generating device further including a turbine in the outlet tube narrowed center to be driven by the airflow, each said wind collector assembly comprising;
   a vertical mast;
   a curved boom;
   a flexible sail connected at its top end to the mast and at its, bottom end to the curved boom;
   a steering sail for orienting said wind collector assembly with respect to an ambient airflow;
   a tensioner connected to said curved boom and to said bottom end of said sail whereby wind loads on said sail can be managed;
   a spring-loaded drum; and
   a wound cable affixed on one end to said bottom end of said sail, and affixed on another end to said drum, said drum providing constant tension on said sail.

2. The wind driven power generating device according to claim 1 wherein said tensioner comprises:
   a counterbalance weight;
   a cable affixed to one end to said bottom end of said sail and affixed on another end to said counterbalance weight, said counterbalance weight providing a constant tension on said sail.

3. The wind driven power generating device according to claim 1 wherein said mechanism for reducing the sail area comprises:
   a collector loop slidably connected to said mast, said loop being movable downwardly along said mast in response to a predetermined load on said sail thereby substantially reducing the area of said sail presented to the ambient airflow.

4. A wind driven power generating device to be driven by an airflow, the device comprising:
   a tube cluster comprising
   a central outlet tube having a narrowed center for channeling an upward flowing airflow;
   heat radiating surfaces connected to said outlet tube;
   a plurality of inlet tubes;
   each inlet tube being defined by a cylindrical wall;
   each inlet tube further having a collector end located at a distance from said central outlet tube, each inlet tube communicating with said central outlet tube for delivering airflow from said inlet tube collector end to said central outlet tube;
   each collector end comprising a plurality of sails located adjacent to one another, a bottom end of each said individual sail extending along a curved boom; and
   the generating device further including a turbine in the outlet tube narrowed center to be driven by the airflow, and a mechanism for reducing the area of the sail presented to the ambient airflow in response to a predetermined load on the sail.

5. A wind driven power generating device to be driven by an airflow, the device comprising:
   a tube cluster comprising;
   a central outlet tube having a narrowed center for channeling an upward flowing airflow;
   a plurality of inlet tubes;
   each inlet tube being defined by a cylindrical wall;
   each inlet tube further having a collector end located at a distance from said central outlet tube, each inlet tube communicating with said central outlet tube for delivering airflow from said inlet tube collector end to said central outlet tube;
   each collector end having a wind collector assembly comprising
   a vertical mast;
   a curved boom; and
   a flexible collector sail connected at its top end to the mast and at its bottom end to the curved boom;
   a mechanism for reducing the area of the collector sail presented to the ambient wind airflow in response to a predetermined load cn the sail;
   a steering sail for orienting said wind collector assembly with respect to an ambient overflow;
   and the generating device further including
   a turbine in the outlet tube narrowed center to be driven by the airflow.

6. A wind driven power generating device to be driven by an airflow, the device comprising:

a tube cluster comprising:

a central outlet tube having a narrowed center for channeling an upward flowing airflow;

a plurality of inlet tubes;

each inlet tube further having a collector end located at a distance from said central outlet tube, each inlet tube communicating with said central outlet tube for delivering airflow from said inlet tube collector end to said central outlet tube;

each collector end having a wind collector assembly comprising a vertical mast;

each said wind collector assembly comprising:

a vertical mast;

a curved boom; and a plurality of collector sails, each collector sail connected at its top end to the mast and at its bottom end to the curved boom;

a steering sail for orienting said wind collector assembly with respect to an ambient airflow;

a tensioner connected to said curved boom and to said bottom end of said sail whereby wind loads on said sail can be managed;

a spring-loaded, damped drum;

a wound cable affixed on one end to said bottom end of said sail, and affixed on another end to said drum, said drum providing constant tension on said sail;

the generating device further including a turbine in the outlet tube narrowed center to be driven by the airflow.

* * * * *